(12) United States Patent
Mitchell et al.

(10) Patent No.: US 6,916,056 B2
(45) Date of Patent: Jul. 12, 2005

(54) BARIATRIC GURNEY AND PROCESS

(75) Inventors: Donald E. Mitchell, Mooresville, IN (US); Thomas Godby, Indianapolis, IN (US); Steve Nelson, Brownsburg, IN (US)

(73) Assignee: Godby Enterprises, LLC, Indianapolis, IN (US)

( * ) Notice: Subject to any disclaimer, the term of this patent is extended or adjusted under 35 U.S.C. 154(b) by 0 days.

(21) Appl. No.: 10/687,844

(22) Filed: Oct. 17, 2003

(65) Prior Publication Data

US 2004/0080172 A1 Apr. 29, 2004

Related U.S. Application Data

(60) Provisional application No. 60/419,499, filed on Oct. 18, 2002.

(51) Int. Cl.$^7$ .................................................. A61G 3/06
(52) U.S. Cl. ........................... 296/20; 5/430; 414/538
(58) Field of Search ................. 296/20, 19; 414/538, 414/500; 5/430, 428, 425; 119/847–849

(56) References Cited

U.S. PATENT DOCUMENTS

| | | | |
|---|---|---|---|
| 1,603,309 A | * 10/1926 | Bennett | 296/19 |
| 1,835,840 A | * 12/1931 | Barclay | 296/65.04 |
| 2,142,215 A | 1/1939 | Schmidt | |
| 2,327,680 A | * 8/1943 | Tavaris | 414/522 |
| 2,387,082 A | * 10/1945 | Malling | 414/500 |
| 2,665,020 A | * 1/1954 | Whittle | 414/500 |
| 3,071,348 A | * 1/1963 | Huber | 410/23 |
| 3,627,396 A | 12/1971 | Miller | |
| 3,630,565 A | * 12/1971 | Lehmann et al. | 296/19 |
| 3,722,011 A | 3/1973 | Miller | |
| 3,743,344 A | 7/1973 | Jameson | |
| 3,823,992 A | 7/1974 | Corbett | |
| 3,918,554 A | * 11/1975 | Bourgraf et al. | 188/32 |
| 3,955,847 A | * 5/1976 | Schiowitz | 296/65.04 |
| 4,040,693 A | 8/1977 | Peterson et al. | |
| 4,043,468 A | 8/1977 | Shea | |
| 4,060,271 A | * 11/1977 | Williams | 296/65.04 |
| 4,115,884 A | * 9/1978 | Keogh | 5/625 |
| 4,123,977 A | 11/1978 | Heath | |
| 4,275,896 A | * 6/1981 | Eicher | 280/43.1 |
| 4,339,147 A | * 7/1982 | Kimzey | 296/24.31 |
| 4,378,128 A | 3/1983 | Holling et al. | |
| 4,444,429 A | 4/1984 | Dawes | |
| 4,534,075 A | * 8/1985 | Schnitzler | 5/628 |
| 5,135,350 A | 8/1992 | Eelman et al. | |
| 5,178,432 A | 1/1993 | Zeman et al. | |
| 5,283,919 A | 2/1994 | Grant | |
| 5,423,651 A | * 6/1995 | Dinverno | 414/500 |
| 5,522,100 A | * 6/1996 | Schilling et al. | 5/86.1 |
| 5,530,973 A | 7/1996 | Dodge | |
| 5,651,149 A | * 7/1997 | Garman | 5/81.1 R |
| 5,662,373 A | 9/1997 | Hanemaayer | |
| 5,669,090 A | 9/1997 | Basgall | |
| 5,898,961 A | 5/1999 | Ambach et al. | |
| 5,913,270 A | 6/1999 | Price | |
| 5,913,559 A | * 6/1999 | Sexton et al. | 296/20 |
| 6,024,528 A | * 2/2000 | Taylor | 414/495 |
| 6,102,645 A | 8/2000 | Kooima et al. | |
| 6,125,485 A | 10/2000 | Way et al. | |
| 6,161,228 A | 12/2000 | Wietecha | |
| 6,230,662 B1 | 5/2001 | Miale et al. | |
| 6,357,991 B1 | * 3/2002 | Hamlett | 414/538 |
| 6,374,437 B1 | * 4/2002 | Voelker | 5/600 |
| 6,568,009 B2 | 5/2003 | Linger et al. | |
| 6,616,396 B2 | * 9/2003 | Sternberg | 414/538 |
| 6,619,768 B1 | 9/2003 | Northrop et al. | |
| 2002/0073902 A1 | 6/2002 | Jipp | |
| 2003/0071472 A1 | 4/2003 | Henderson et al. | |
| 2003/0090117 A1 | 5/2003 | Cormier et al. | |
| 2004/0202533 A1 | * 10/2004 | Haire | 414/538 |

* cited by examiner

Primary Examiner—Patricia L. Engle
(74) Attorney, Agent, or Firm—Woodard, Emhardt, Moriarty, McNett & Henry LLP (57) ABSTRACT

Bariatric gurney and process including a winch mounted in an ambulance for pulling the gurney up removable rails. The gurney includes extenders for increasing the patient support surface of the gurney and may include a removable patient safety bar.

10 Claims, 11 Drawing Sheets

BARIATRIC GURNEY AND PROCESS

This application claims the benefit of priority to U.S. provisional patent application Ser. No. 60/419,499, filed Oct. 18, 2002, which is incorporated herein by reference.

FIELD OF THE INVENTION

The present invention relates to a bariatric gurney and to a process of moving a bariatric patient.

BACKGROUND OF THE INVENTION

The present invention relates to moving a heavy or very large patient from place to place, for example, from the hospital to the residence or vice versa. In many cases the ambulance service will refuse the employment in order to avoid injury to the personnel moving the patient and to avoid injury to the patient. The present invention is intended to eliminate or reduce such injuries and to make such movements easier.

SUMMARY OF THE INVENTION

One embodiment of the present invention might involve a bariatric gurney arrangement including an ambulance having a floor. The gurney also has a carriage with wheels. Removable rails with sides on them are connected to the ambulance and lead to the floor for supporting the gurney and guiding the wheels up to the floor. Mounted on the ambulance is a winch which is connectable to the gurney for pulling the gurney up the rails to the floor. There are rings mounted on the floor and on the gurney and straps connect the rings on the floor and the gurney. The winch is arranged to pull the gurney to tighten the straps connecting the rings on the floor and the rings on the gurney for securing the gurney in place on the floor.

A further embodiment of the invention is a bariatric gurney including a carriage arrangement. There are wheels on the carriage arrangement. A flat sheet is mounted on the carriage arrangement and for supporting a patient. A pair of extenders are mounted on the carriage arrangement on the opposite sides of the flat sheet. The extenders are fixable in a horizontal position to increase the support area of the flat sheet and are also fixable in a vertical position to make more narrow the width of the gurney.

A further embodiment of the invention is a process for moving a bariatric patient. The process includes providing an ambulance having a floor and a winch and providing a gurney including a carriage with wheels. Rails are attached to the ambulance with the rails leading to the floor of the ambulance. The patient is placed on the carriage and the winch is attached to the gurney. The gurney is pulled up the rails to the floor of the ambulance by operation of the winch. Finally, the gurney is secured in place by attaching straps to the ambulance and then operating the winch to move the gurney to tighten the straps.

Still another embodiment of the invention involves a bariatric gurney including a lower carriage. Wheels are mounted on the lower carriage. There is also provided an upper carriage mounted on the lower carriage for vertical movement while maintaining a horizontal orientation. A hydraulic cylinder is connected between the upper and lower carriage for raising and lowering the upper carriage relative to the lower carriage.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Figure 1:
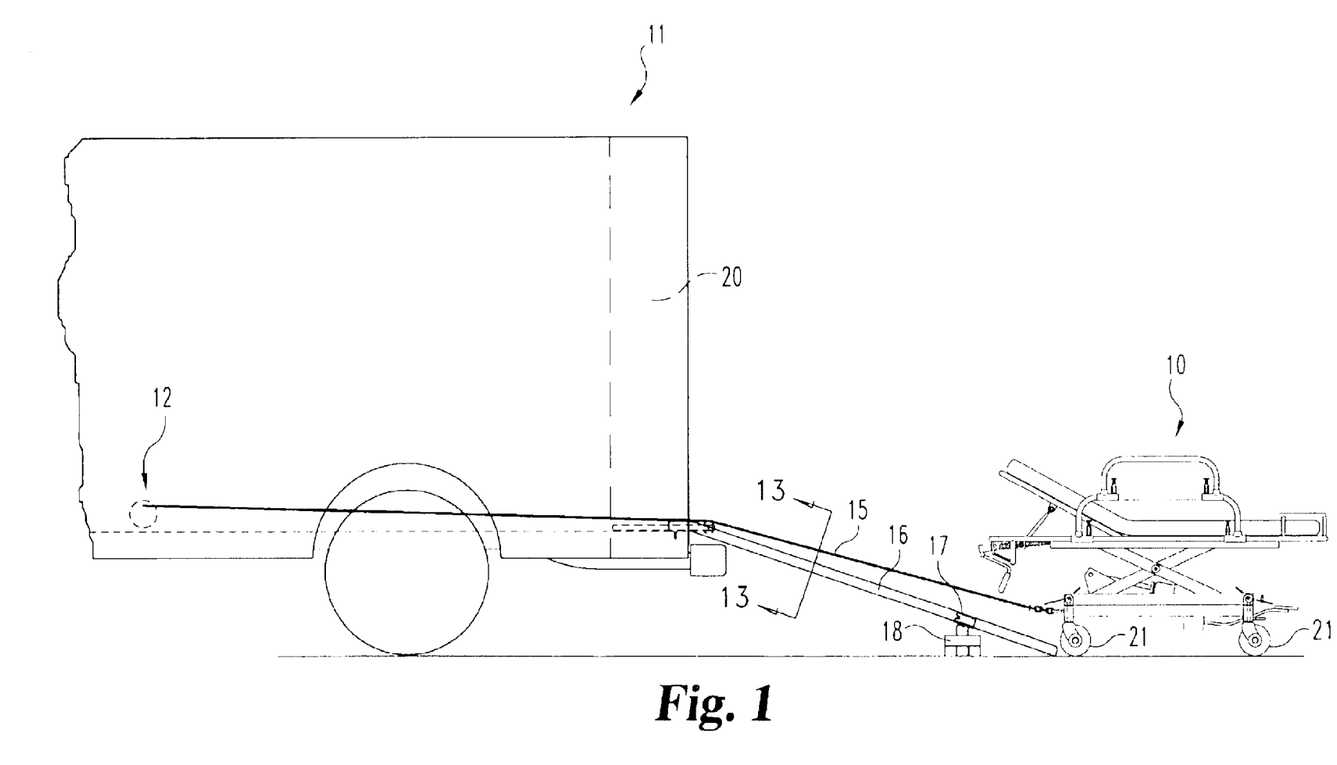
FIG. 1 is a side elevation of the bariatric gurney of the present invention and a fragmentary view of an ambulance showing a step in the process of the present invention.
Figure 13:
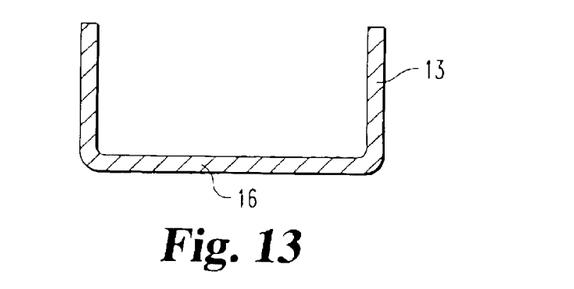
FIG. 13 is an enlarged cross section of a ramp taken along the line 13—13 of FIG. 1 in the direction of the arrows.

Referring to FIG. 1, the present invention involves moving a heavy or very large patient from the hospital to the residence or vice versa. In many cases the movement of a relatively large or heavy patient causes injury to the personnel moving the patient and also possibly to the patient and the present invention is intended to eliminate or reduce such injuries as well as to make such movements easier. FIG. 1 shows the bariatric gurney 10 being moved into the rear of the ambulance 11 by means of a winch 12 which is mounted on the ambulance and includes a line 15. The gurney 10 is moved up a pair of ramps 16 which are foldable at a joint 17 and may be supported by a set of chocks or cribbing 18 consisting of 2×4s in a criss-crossed position. After use the ramps 16 are folded and placed into a suitable vertical compartment in the rear side of the ambulance at 20. Preferably the ramps are manufactured of steel or aluminum and have sides 13 (FIG. 13) on them so as to prevent the wheels 21 on the gurney from rolling off of the ramps. The ramps also should be chosen so as to be able to hold up to 3,000 pounds.

One example of a winch 12 that might be used in the invention is Model No. V42R 4200LB-12 VDC, manufactured by Rule Industries, Inc., of Gloucester, Mass. 01930.

Figure 5:
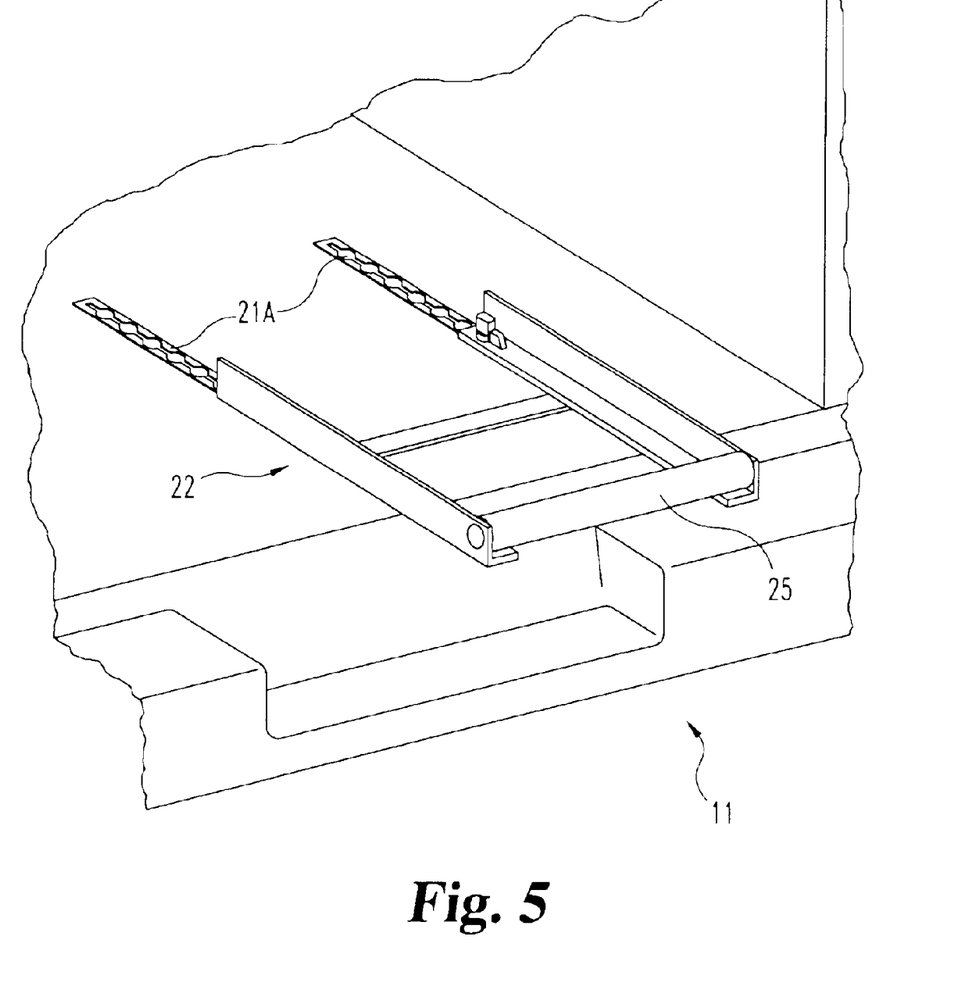
FIG. 5 is a fragmentary perspective view of the rear of the ambulance showing a device for preventing damage by use of the winch in the ambulance.

Referring to FIG. 5 the rear of the ambulance is shown as having fixtures 21A fixedly installed therein that provide mounting for a roller mechanism 22 which receives the winch line 15 and prevents it from damaging the back of the ambulance. The roller mechanism 22 has a roller 25 rotatably mounted thereon and over which the winch line 15 operates. The winch 12 should be chosen so as to be able to be reeled in on a stop and start fashion by an individual located inside of the rear of the ambulance 11 to make sure that the procedure is carried out without harm to the patient or to the attendants. The winch should also be capable of letting out the line on a stop and start fashion as controlled by an individual inside the rear of the ambulance for the purpose of unloading the patient and the gurney 10 from the ambulance.

Figure 2:
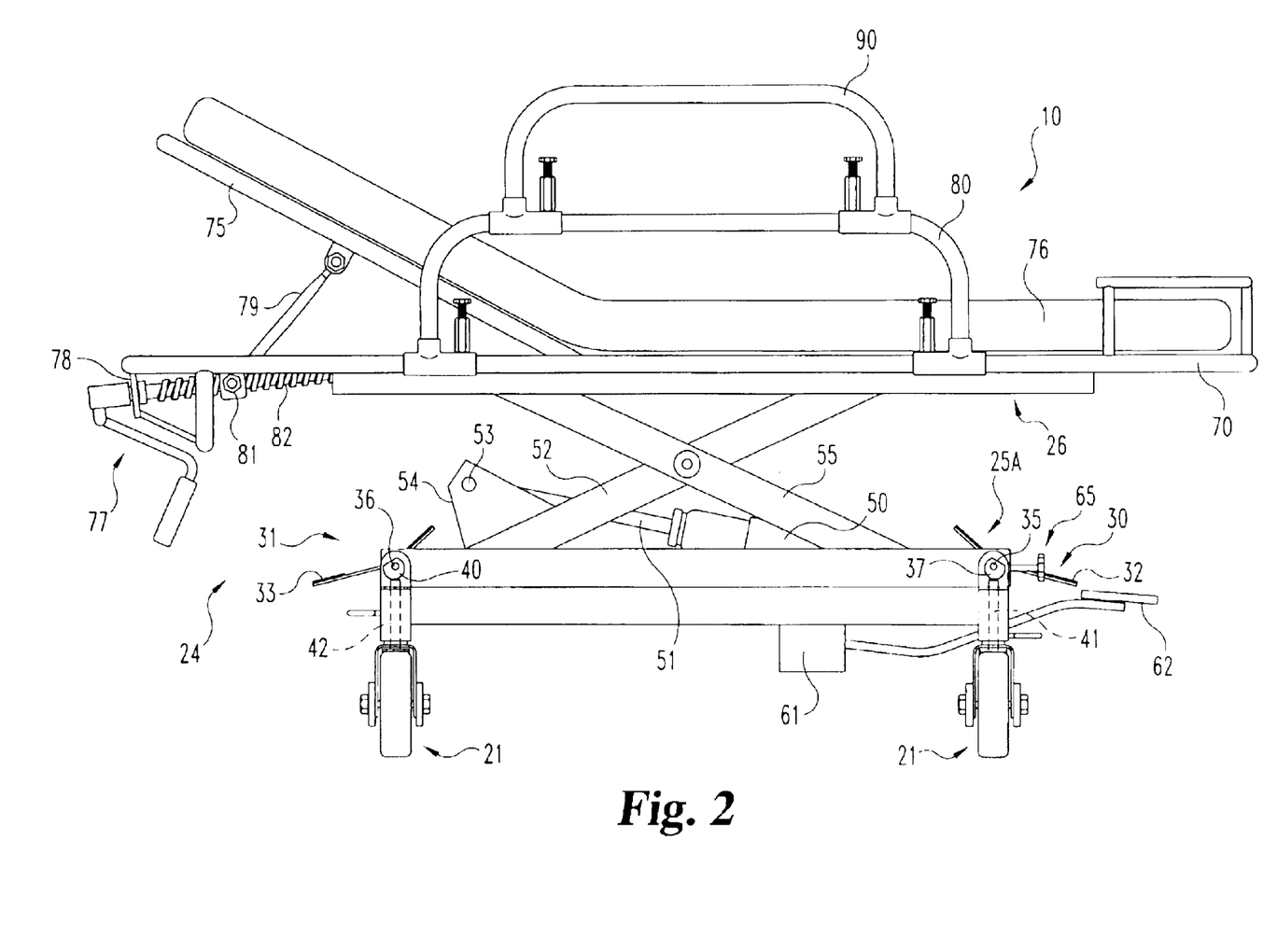
FIG. 2 is a side elevation of the bariatric gurney of the present invention.
Figure 10:
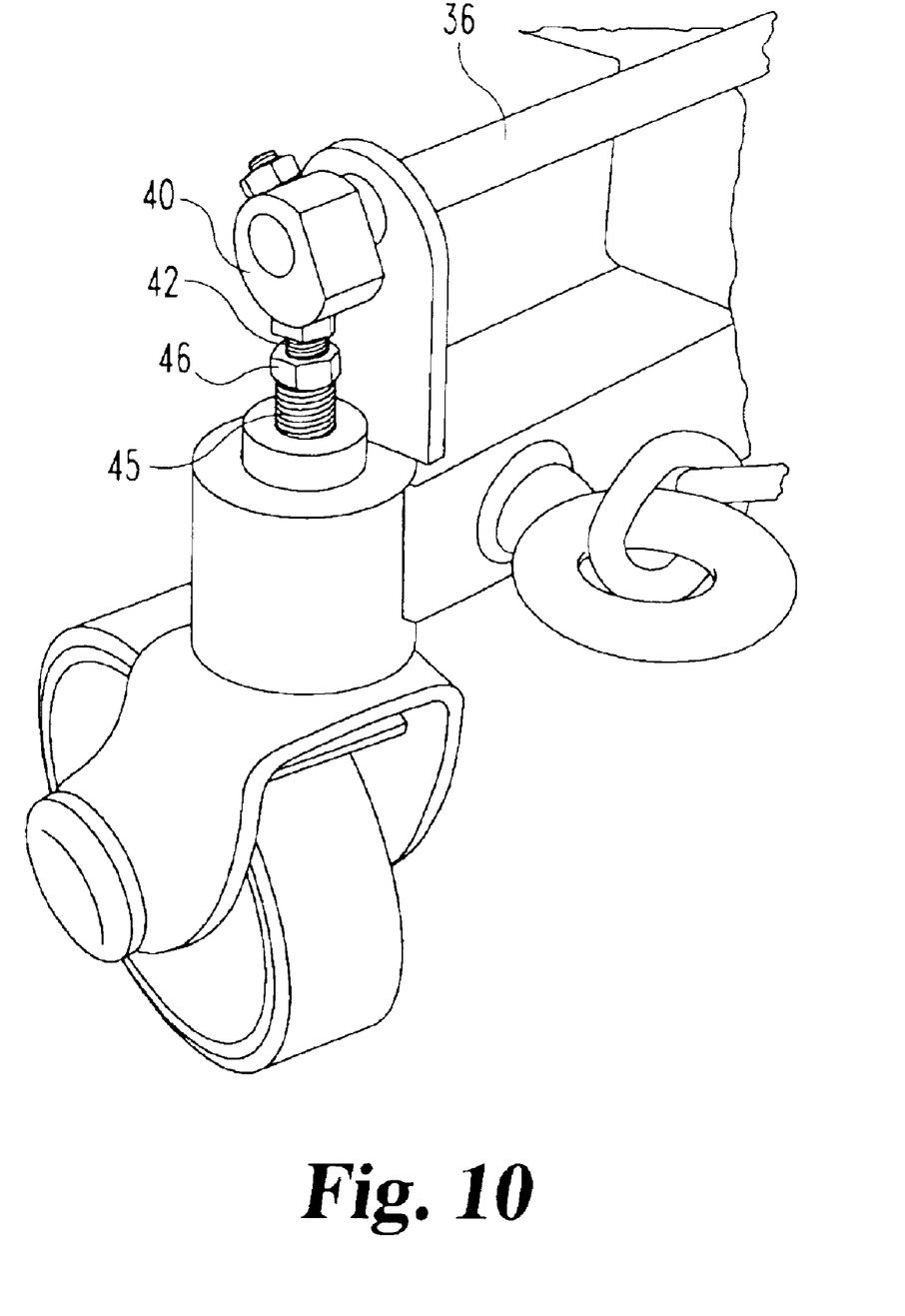
FIG. 10 is an enlarged perspective view showing in detail one of the wheels of the gurney.

FIG. 2 shows an enlarged side elevation of the gurney 10. The gurney 10 consists of a carriage arrangement 24 including a lower carriage 25A and an upper carriage 26. Mounted on the lower carriage 25A are four wheels 21. Also mounted on the lower carriage 25 are foot brakes 30 and 31 which may be actuated by depressing the pedals 32 and 33 respectively. Each of the pedals 32 and 33 is fixed to a respective shaft 35 and 36 which has a respective cam 37 and 40 fixed thereto. Each of the cams actuates a shaft 41 and 42 respectively which presses against the respective wheels in order to brake them. FIG. 10 shows a representation of one of these mechanisms in greater detail and also shows a spring 45 which operates against a nut 46 to urge the shaft 42 upwardly so as to disengage the braking action when the pedal is not being depressed. The nut 46 is threadably received on the shaft 42.

Figure 11:
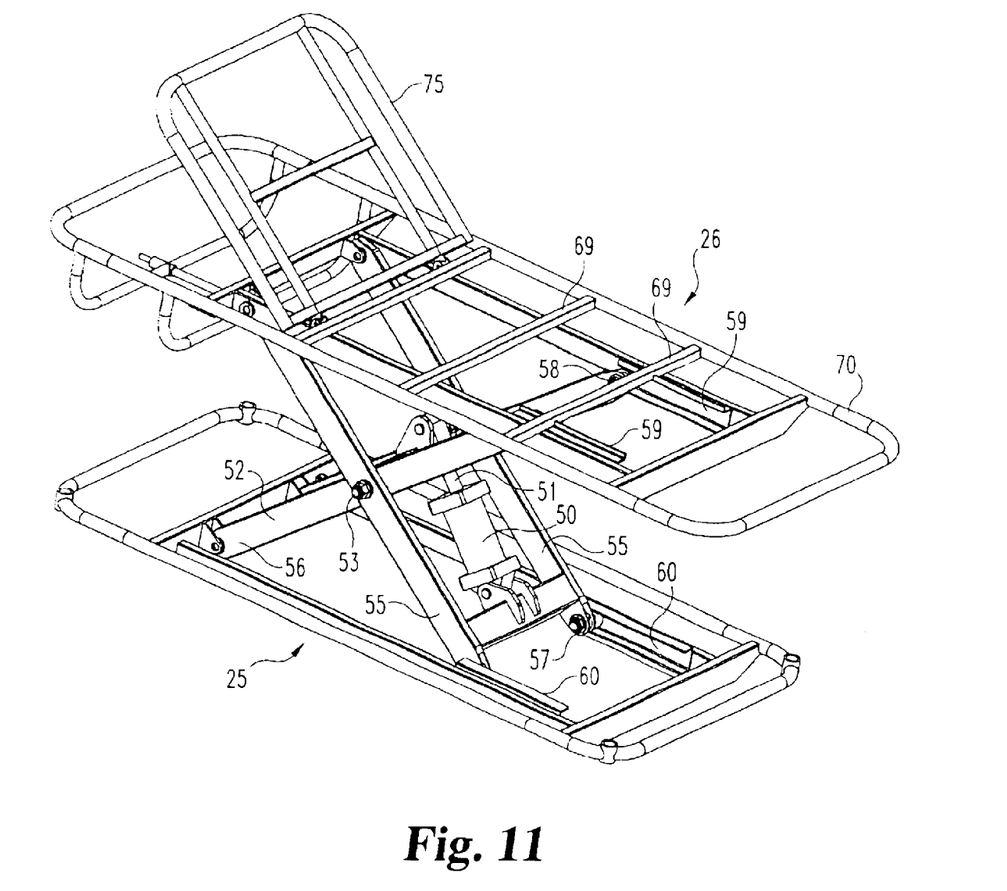
FIG. 11 is a perspective view of the gurney showing certain parts removed in order to show internal working parts.

A hydraulic cylinder 50 is mounted on the lower carriage and is used to raise and lower the upper carriage 26. The manner of operation of the hydraulic cylinder to accomplish this is shown in FIG. 11. The hydraulic cylinder has its piston connected pivotally to the lower ends of the crisscross members 52 of the crisscross members 52 and 55. The members 52 are pivotally connected at their lower ends 56 to the lower carriage 25 and are slidably connected at their upper ends by suitable rollers 58 to the tracks 59 mounted on the upper carriage 26. The crisscross members 52 and 55 are pivotally connected to each other at 53. The members 55 of the crisscross members are pivotally connected at their upper ends to the upper carriage and are slidably connected to the lower carriage 25 by suitable rollers 57 at their lower ends in tracks 60 so that as the upper carriage moves up and down it is maintained in a horizontal position. The hydraulic cylinder 50 is pumped so as to raise the carriage by a foot pump 61 (FIG. 2) actuated by the foot pedal 62. The fluid in the hydraulic cylinder 50 may be released by opening a valve by actuation of a rotatable knob 65 to slowly let down the upper carriage 26. The valve can be closed by activating knob 65 so as to lock the height position of the upper carriage at any desired height.

Alternative means may be provided for raising and lowering the upper carriage 26 relative to the lower carriage 25. Thus, the hydraulic cylinder may be replaced by electronic means that would require only moving a switch or a button one way or the other to slowly move the height of the upper carriage from one position to another.

It should be noted that the connection of the piston 51 of the hydraulic cylinder 50 is correctly shown in FIG. 2 and is not as suggested in FIG. 11 because the function of the hydraulic cylinder is to pull together and to separate the lower ends 56 of the crisscross members 52 and 55. Thus, the piston 51 of the hydraulic cylinder is pivotally secured at 53 to a member 54 fixed to the lower ends of the crisscross members 52. When the hydraulic piston is forced outwardly, the hydraulic cylinder is moved rightward as viewed in FIG. 2 and the upper carriage is lowered. When the hydraulic piston is moved into the hydraulic cylinder, the hydraulic cylinder is moved leftward as viewed in FIG. 2 and the upper carriage is raised.

Figure 12:
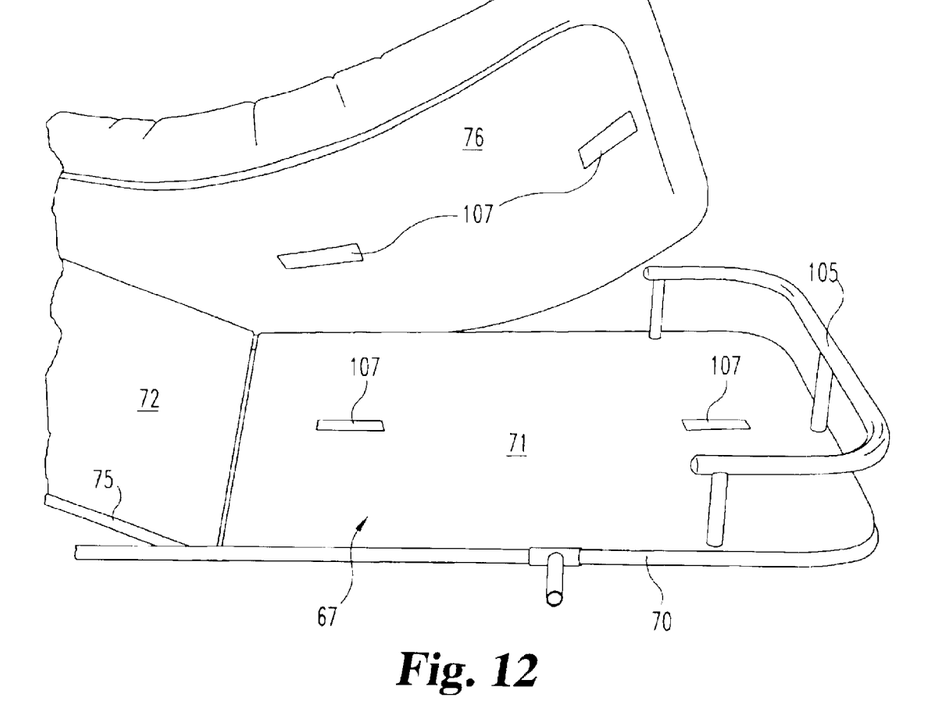
FIG. 12 is a perspective view of the foot end of the gurney with the mattress lifted to show obscured portions of the gurney.

The upper carriage 26 includes tubing 70 that extends all of the way around the upper carriage and together with cross members 69 (FIG. 11) supports and mounts a flat sheet 67 which includes a lower flat sheet portion 71 which is best shown in FIG. 12. Pivotally mounted upon the upper carriage 26 is an upper flat sheet portion 72 bordered by tubing 75. The flat sheet portions 71 and 72 may be made out of any hard relatively rigid sheet material, such as, for example, carbon fiber. A mattress 76 is supported upon the upper carriage and specifically upon the sheets 71 and 72. The upper sheet portion 72 and the upper portion of the mattress 76 may be raised and lowered by a crank 77. (FIG. 2) The crank 77 is mounted for rotation on the upper carriage on the projecting member 78. The crank is connected to the upper sheet portion 72 by link 79 which is pivotally connected to the upper sheet portion 72. The link 79 is also pivotally connected to internally threaded member 81 which is threadedly received on the threaded portion 82 of the crank 77.

Figure 3:
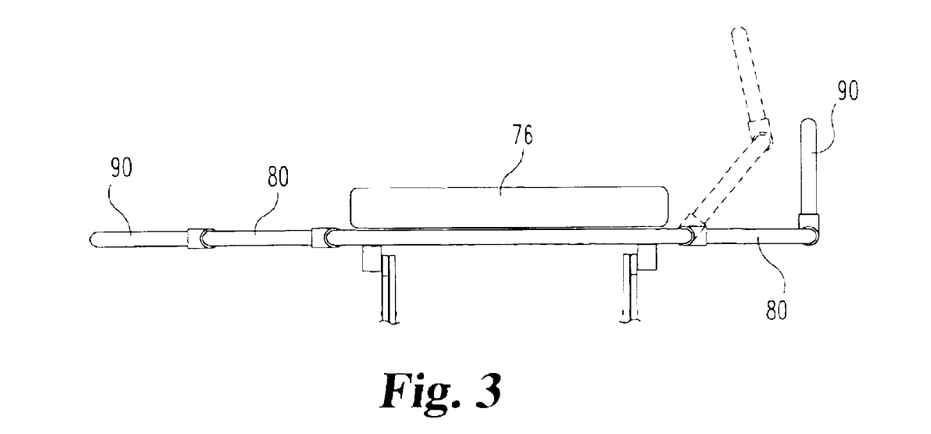
FIG. 3 is a fragmentary end elevation.
Figure 4:
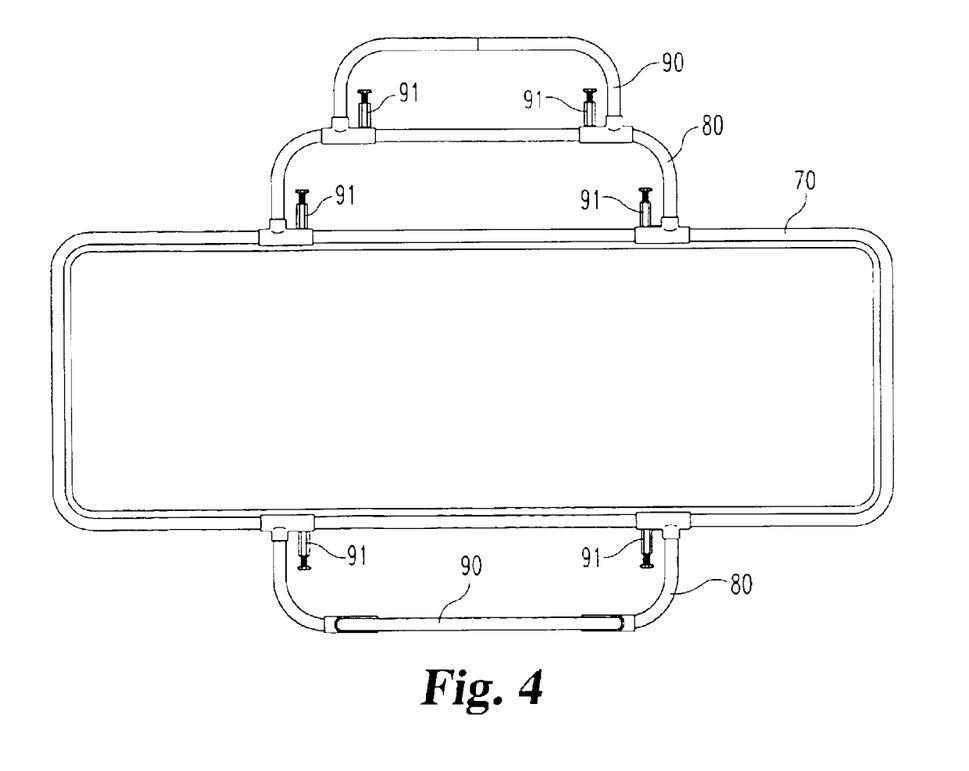
FIG. 4 is a top plan.

Also mounted upon the tubing 70 are side rails 80 and 90 which function as extenders of the patient supporting surface. As shown in FIGS. 3 and 4 the side rails 80 and 90 can be locked in a horizontal or in a vertical position by means of locks 91. Each of the locks 91 operates by engaging a bore in the respective tubing 70 or side rail 80 within which the rod of the lock is received. The locks 91 may screw into the respective tubing or side rail or may be spring biased. There are two bores located in each section of tubing with respect to each of the locks 91. One of the bores allows the side rail to be positioned in a vertical position and the other allows it to be positioned in a horizontal position. As shown in FIG. 3 the side rails 80 are locked in a horizontal position while one of the side rails 90 is locked in a vertical position. Also shown in FIG. 3 in dotted lines the side bars can be moved upwardly so as to reduce the total sideward dimension of the gurney for moving it into and out of relatively small doors in a residence or the like and also for moving it into and out of the rear of the ambulance.

Figure 6:
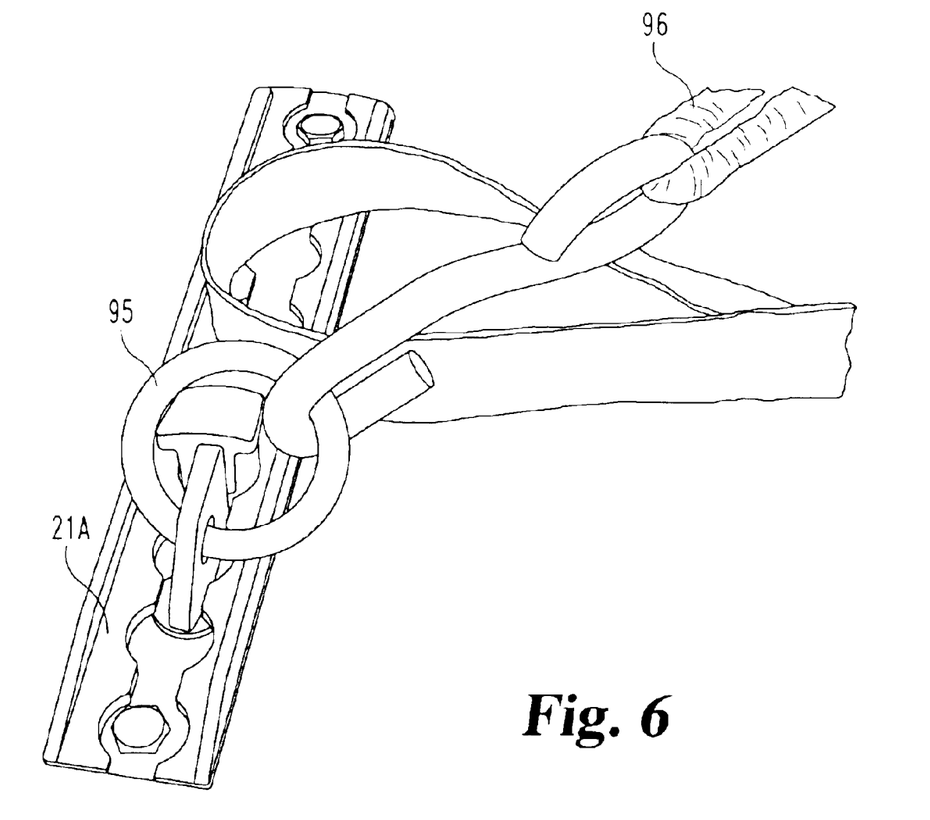
FIG. 6 is a perspective view of the inside of the ambulance showing means for securing the gurney in place in the ambulance.
Figure 7:
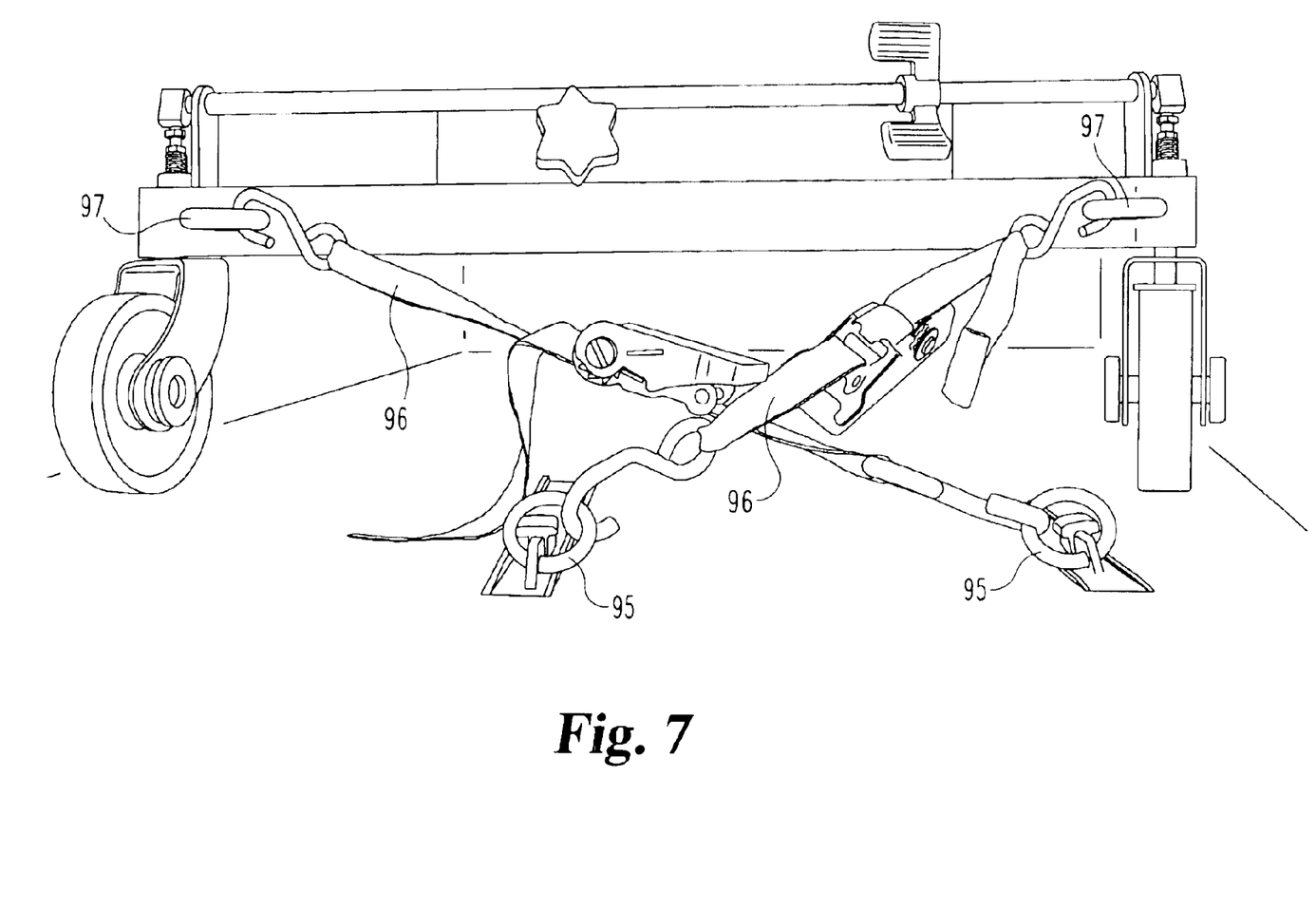
FIG. 7 is a perspective view looking into the ambulance showing the gurney secured in place in the ambulance.
Figure 8:
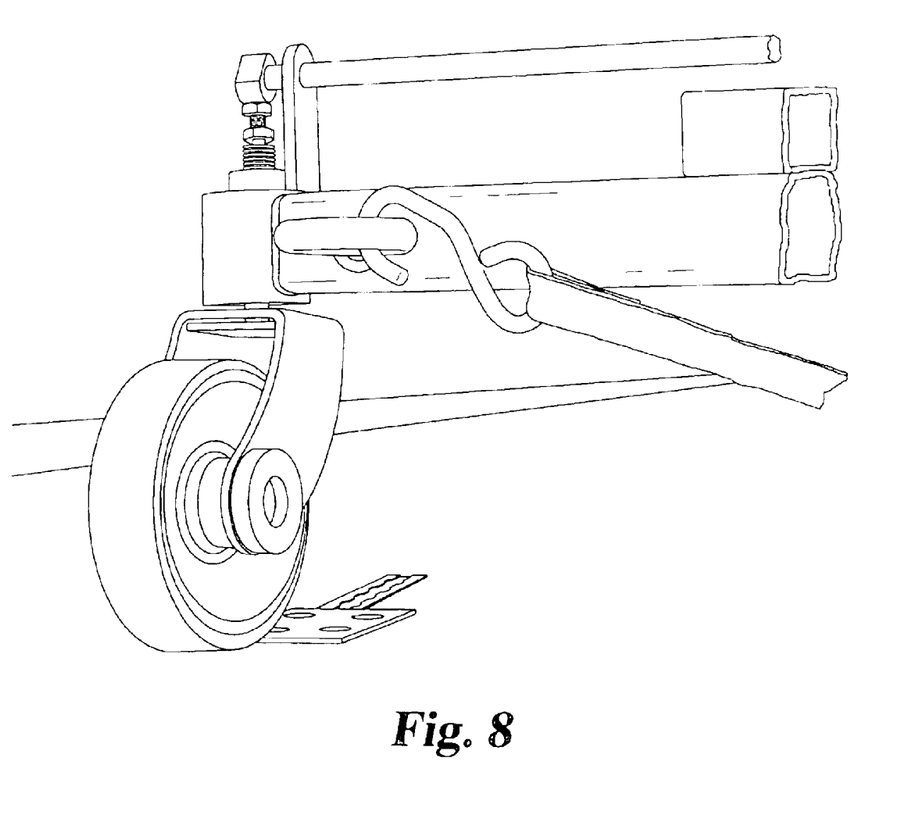
FIG. 8 is a perspective view showing in detail one of the wheels of the gurney.
Figure 9:
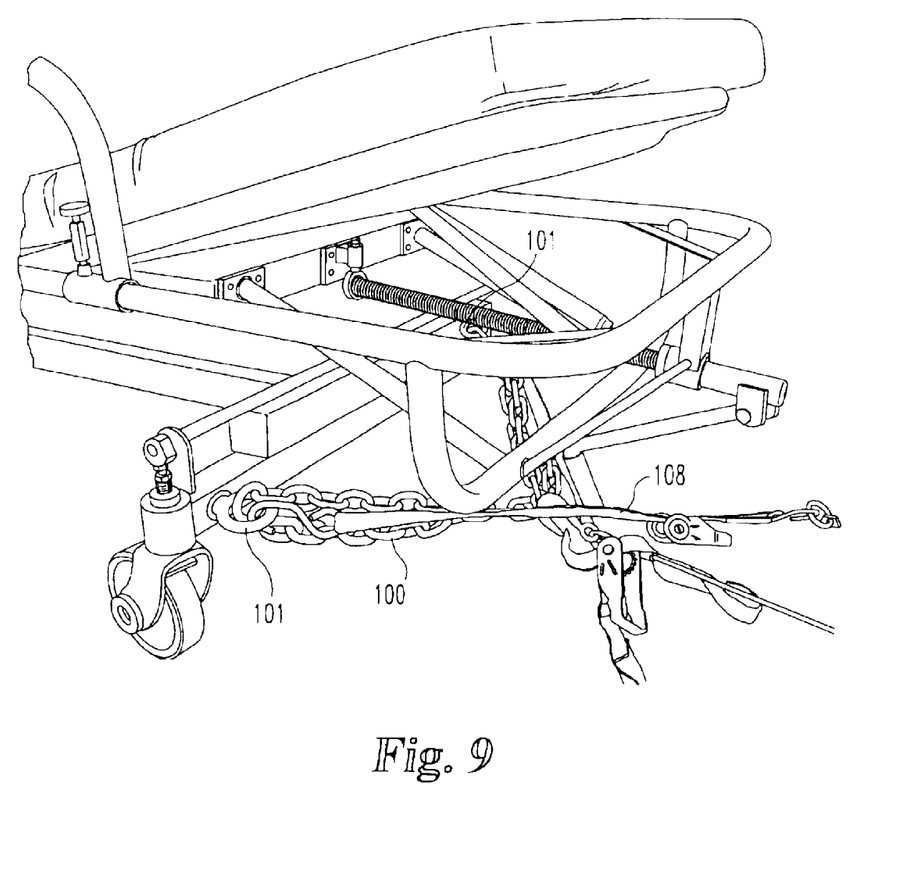
FIG. 9 is a perspective view showing the head end of the gurney secured in the ambulance.

Referring to FIG. 6 one of the fixtures 21 is shown as mounting a ring 95 for securing the gurney in place when it is inside of the ambulance. Straps 96 connect the rings 95 to rings 97 fixedly mounted on the lower carriage as best shown in FIG. 7. FIG. 7 is a view looking into the ambulance and therefore shows the end of the gurney away from the winch. After the straps 96 have been put in place the winch 12 can be tightened so as to tighten the straps 96 and secure the gurney in position in the ambulance. FIG. 9 shows the head end of the gurney and also shows a chain 100 connected to rings 101 that are fixedly mounted on the head end of the lower carriage 25 for connecting the winch to the gurney.

Referring again to FIG. 12 there is illustrated a safety bar 105 that is fixedly mounted at the foot end of the upper carriage and specifically to the tubing 70. The safety bar 105 prevents the patient and the mattress from sliding off of the gurney as it is being moved up the rails into the ambulance. Alternatively, the safety bar 105 may be fixedly but removably mounted on the upper carriage. Such removability may be useful in getting the patient on and off the gurney. Also shown in FIG. 12 is VELCRO™ (hook and loop) fashion 107 mounted on the mattress and the flat sheet portion in order to The gurney has an overall length of 80 inches and a minimum width of 33 inches and a maximum width of 56 inches. The weight of the gurney is 400 pounds and the maximum weight capacity is designed to be 2000 pounds.

The process of the present invention is intended to be used whenever a patient exceeds 500 pounds or is wider than a standard stretcher. The crew carrying out the process will go to the destination and inspect the destination and insure access to the residence. This would normally be completed prior to loading the patient onto the gurney. The transporting crew will then respond to the facility and assess the patient and the situation to see if transport can be effected. If it is determined that the patient's residence is not properly prepared for safe transfer the patient will not be transferred. The origin facility will be informed of the patient's residence not being suitable and the patient will remain in that facility until suitable and safe conditions exist for transfer. Assuming that transfer can be safely effected the crew makes sure sufficient manpower is on the scene to assure a safe transfer for all parties.

Carrying out the transfer it is important that the ramps are properly set up and cribbed and that the arrangement is performed on level ground. When placing the gurney in the ambulance the front wheels should be lined up with the ramps with the head end first. Winch cable is then hooked up to the gurney by connecting to the chain 100. One individual inside of the ambulance or truck operates the winch control and also watches the gurney coming up the rails or ramps to make sure that it is going up the ramps in a straightforward fashion. One or two persons are located at the lower end of the gurney to make sure that the rear wheels line up with the ramps. Once all four wheels are on the ramps and lined up the winch is not stopped. It should be kept going unless there is some emergency problem with the gurney. In going up the ramp it is important to make sure that the head end of the cot is not up so that the patient's head does not engage the upper portion of the ambulance. When the gurney is inside the ambulance the tie downs (straps) are locked down and the first tie downs to be locked down are the rear tie downs (straps 96). The front tie downs (straps 108 FIG. 9) are then locked in place and the winch is tightened up for more security.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, the entire framework of the gurney may be made out of stainless steel with the exception of the hydraulic cylinder.

What is claimed:

1. A bariatric gurney arrangement comprising
   (a) an ambulance having a floor;
   (b) a gurney including a carriage with wheels;
   (c) removable rails with sides connected to said ambulance and leading to said floor for supporting said gurney and guiding said wheels up to said floor;
   (d) a winch mounted on said ambulance and connectable to said gurney for pulling said gurney up said rails to said floor;
   (e) rings mounted on said floor and on said gurney;
   (f) and straps connecting the rings on said floor and said gurney;
   (g) said winch being arranged to pull said gurney to tighten the straps connecting the rings on said floor and the rings on said gurney for securing the gurney in place on said floor.

2. The bariatric gurney arrangement of claim 1 additionally comprising a roller rotatably mounted on the ambulance, said winch including a line that is attached to said gurney and extends over said roller, said roller protecting the floor of said ambulance.

3. The bariatric gurney arrangement of claim 1 additionally comprising a flat sheet mounted on said gurney for supporting a patient and an extender mounted on the gurney adjacent said flat sheet, said extender being fixable in a horizontal position to increase the support area of the flat sheet, and said extender being fixable in a vertical position to make more narrow the width of the gurney.

4. The bariatric gurney of claim 1 additionally comprising a flat sheet mounted on said gurney for supporting a patient, said flat sheet having opposite sides, a pair of extenders mounted on the gurney on the opposite side of said flat sheet for supporting the patient, said extenders being fixable in a horizontal position to increase the support area of the flat sheet, said extenders being fixable in a vertical position to make more narrow the width of the gurney.

5. The bariatric gurney arrangement of claim 1 additionally comprising a safety bar mounted on said gurney for preventing the patient from sliding off of said gurney, said safety bar being fixedly but removably mounted on said gurney.

6. A process for moving a bariatric patient comprising
   (a) providing an ambulance having a floor and a winch;
   (b) providing a gurney including a carriage with wheels;
   (c) attaching rails to the ambulance with the rails leading to the floor of the ambulance;
   (d) placing the patient on the carriage;
   (e) attaching the winch to the gurney and pulling the gurney up the rails and on to the floor of the ambulance by operation of the winch;
   (f) securing the gurney in place by attaching straps to the ambulance and then operating the winch to move the gurney to tighten the straps.

7. The process for moving a bariatric patient of claim 6 additionally comprising providing an individual inside of the ambulance, causing the individual inside the ambulance to operate the winch and to watch the gurney to make sure it is coming up the rails in a straightforward fashion, providing at least one individual at the lower end of the rails to make sure that the wheels line up with the rails.

8. The process for moving a bariatric patient of claim 6 additionally comprising providing a roller rotatably mounted on the ambulance, said winch including a line that is attached to said gurney and extends over said roller, said roller protecting the floor of the ambulance.

9. The process for moving a bariatric patient of claim 6 additionally comprising a flat sheet mounted on said gurney for supporting the patient, said flat sheet having opposite sides, and a pair of extenders mounted on said gurney on the opposite sides of said flat sheet, said extenders being fixable in a horizontal position to increase the support area of the flat sheet, said extenders being fixable in a vertical position to make more narrow the width of the gurney.

10. The process of claim 6 additionally comprising a safety bar mounted on said carriage arrangement for preventing the patient from sliding off of the carriage, said safety bar being fixedly but removably mounted on said carriage.

* * * * *